(12) United States Patent
Van Dam et al.

(10) Patent No.: US 12,417,350 B1
(45) Date of Patent: Sep. 16, 2025

(54) INTENT-BASED SUGGESTION OF ADDED PHRASES IN A TEXT EDITOR

(71) Applicant: GRAMMARLY, INC., San Francisco, CA (US)

(72) Inventors: Jennifer Van Dam, San Francisco, CA (US); Sergey Yavnyi, Richmond, CA (US); Xiaoshan Li, Campbell, CA (US); Masha Ivenskaya, San Francisco, CA (US); Jared Foelsch, San Francisco, CA (US)

(73) Assignee: GRAMMARLY, INC.

( * ) Notice: Subject to any disclaimer, the term of this patent is extended or adjusted under 35 U.S.C. 154(b) by 305 days.

(21) Appl. No.: 17/958,981

(22) Filed: Oct. 3, 2022

Related U.S. Application Data

(60) Provisional application No. 63/251,838, filed on Oct. 4, 2021.

(51) Int. Cl.
*G06F 40/30* (2020.01)
*G06F 3/04812* (2022.01)
(Continued)

(52) U.S. Cl.
CPC .......... *G06F 40/30* (2020.01); *G06F 3/04812* (2013.01); *G06F 3/0484* (2013.01);
(Continued)

(58) Field of Classification Search
None
See application file for complete search history.

(56) References Cited

U.S. PATENT DOCUMENTS 7,136,877 B2 * 11/2006 Volcani ................. G06F 40/247
 707/917
8,521,739 B1 8/2013 Pasca
(Continued)

FOREIGN PATENT DOCUMENTS

WO 2020220370 A1 11/2020

OTHER PUBLICATIONS

International Searching Authority, International Search Report and Written Opinion for International Application No. PCT/US2022/042046, mailed Mar. 23, 2023, 17 pages.
(Continued)

*Primary Examiner* — Nicole A K Schmieder
(74) *Attorney, Agent, or Firm* — Van Hoven PC; Jordan Becker

(57) ABSTRACT

A computer-implemented process is programmed to detect a type or category of document that is being drafted and to suggest one or more phrases or sentences to add to the original and/or substitute for the original, the suggested text being potentially more personable and sincere than the writer's original text. Suggested text phrases are selected from a large corpus of previously manually drafted sentences and phrases. Selected text phrases are ranked and filtered to result in suggesting a manageable set of text phrases. With this approach, adding specially chosen content to existing content can change the warmth or tone of the text while preserving its meaning. Unlike prior approaches, in an embodiment, the process is programmed to artificially understand the intent of the original text as a basis of suggesting other content to add. Furthermore, embodiments may interoperate with a visual or graphical user interface that is programmed to enable users to see what the change to the text will be and whether they want it before they engage with the suggestion.

30 Claims, 7 Drawing Sheets

(51) Int. Cl.
*G06F 3/0484* (2022.01)
*G06F 16/334* (2025.01)
*G06F 16/338* (2019.01)
*G06F 16/353* (2025.01)
*G06F 40/166* (2020.01)
*G06F 40/205* (2020.01)
*G06F 40/289* (2020.01)
*G06N 5/022* (2023.01)

(52) U.S. Cl.
CPC ........ *G06F 16/3344* (2019.01); *G06F 16/338* (2019.01); *G06F 16/353* (2019.01); *G06F 40/166* (2020.01); *G06F 40/205* (2020.01); *G06F 40/289* (2020.01); *G06N 5/022* (2013.01)

(56) References Cited

U.S. PATENT DOCUMENTS

| | | |
|---|---|---|
| 9,805,371 B1 | 10/2017 | Sapoznik et al. |
| 9,817,813 B2 | 11/2017 | Faizakof |
| 10,417,350 B1 | 9/2019 | Mohamed |
| 10,691,877 B1 | 6/2020 | Eisner |
| 10,922,483 B1 | 2/2021 | Shevchenko et al. |
| 2012/0297294 A1 | 11/2012 | Scott et al. |
| 2013/0085754 A1 | 4/2013 | Cohen et al. |
| 2016/0224524 A1 | 8/2016 | Kay et al. |
| 2016/0306800 A1 | 10/2016 | Son |
| 2017/0185590 A1 | 6/2017 | Tetreault et al. |
| 2020/0159823 A1 | 5/2020 | Lam et al. |
| 2020/0175109 A1 | 6/2020 | Gee et al. |
| 2020/0387545 A1* | 12/2020 | Tripathi ............ G06N 3/045 |
| 2021/0026924 A1 | 1/2021 | Jones |
| 2021/0126881 A1 | 4/2021 | Ball et al. |
| 2021/0334708 A1 | 10/2021 | Li |
| 2022/0198136 A1* | 6/2022 | Peleg ............ G06F 40/253 |
| 2022/0245377 A1 | 8/2022 | Singh |
| 2023/0048742 A1 | 2/2023 | Mishra |

OTHER PUBLICATIONS

International Searching Authority, International Search Report and Written Opinion for International Application No. PCT/US22/45562, mailed Jan. 31, 2023, 19 pages.

* cited by examiner

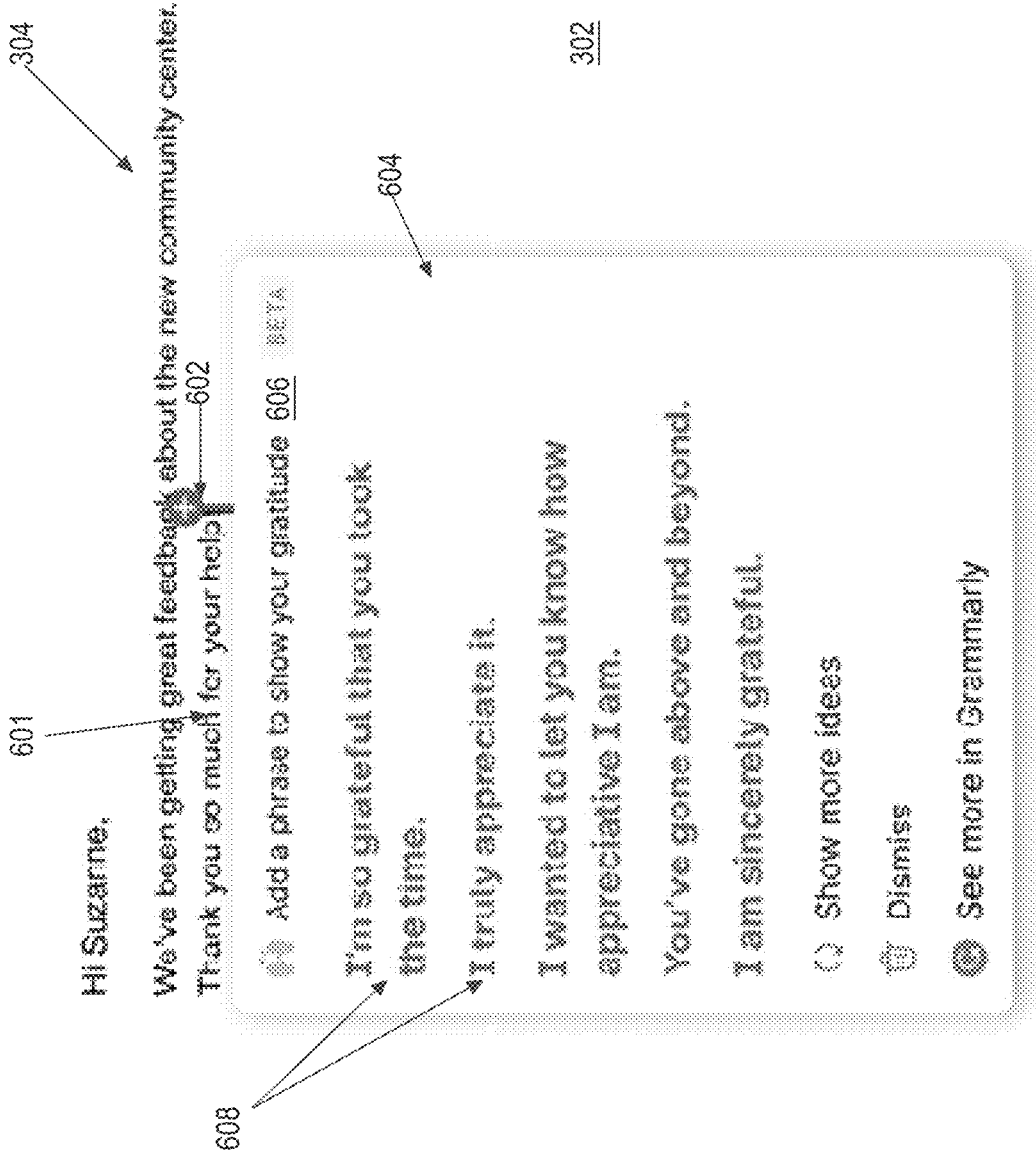

INTENT-BASED SUGGESTION OF ADDED PHRASES IN A TEXT EDITOR

BENEFIT CLAIM; CROSS-REFERENCE TO RELATED APPLICATION

This application claims the benefit under 35 U.S.C. § 119 of provisional application 63/251,838, filed Oct. 4, 2021, the entire contents of which are hereby incorporated by reference for all purposes as if fully set forth herein. The subject matter of application Ser. No. 17/462,879, filed Aug. 31, 2021, relates to this application.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. ©2020-2021 Grammarly, Inc.

TECHNICAL FIELD

One technical field of the present disclosure is computer-implemented natural language processing. Another technical field is natural language text addition, modification or suggestion. The suggested CPC classification is G06F40/40 and G06N5/04.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Writers regularly struggle to select original or appropriate text for several categories of common communications. Examples include "Happy Birthday" greetings, "Thank You" messages, and "Congratulations" messages. For each of these, writers may have difficulty selecting substantive text with an appropriate tone and a sense of sincerity and personal tailoring. Known computer-based online systems are capable of providing a phrase to use in certain contexts; an example is canned responses in LINKEDIN posts. Other systems are capable of changing text from one type to another by rewriting it with different words, for example from formal to informal, such as WORDTUNE. However, rewriting systems operate at the risk of changing the meaning of the original text.

Based on the foregoing, there is an acute need in the relevant technical fields for a computer-implemented, high-speed online system with real-time response capable of inspecting a draft text and suggesting alternative text that improves the original or supplements the original in a manner that clarifies the text and/or improves its tone.

SUMMARY

The appended claims may serve as a summary of the invention.

BRIEF DESCRIPTION OF THE DRAWINGS

In the drawings:

FIG. 6B illustrates a GUI window of suggestions that is displayed in-line with the source text.

DETAILED DESCRIPTION

Figure 1:
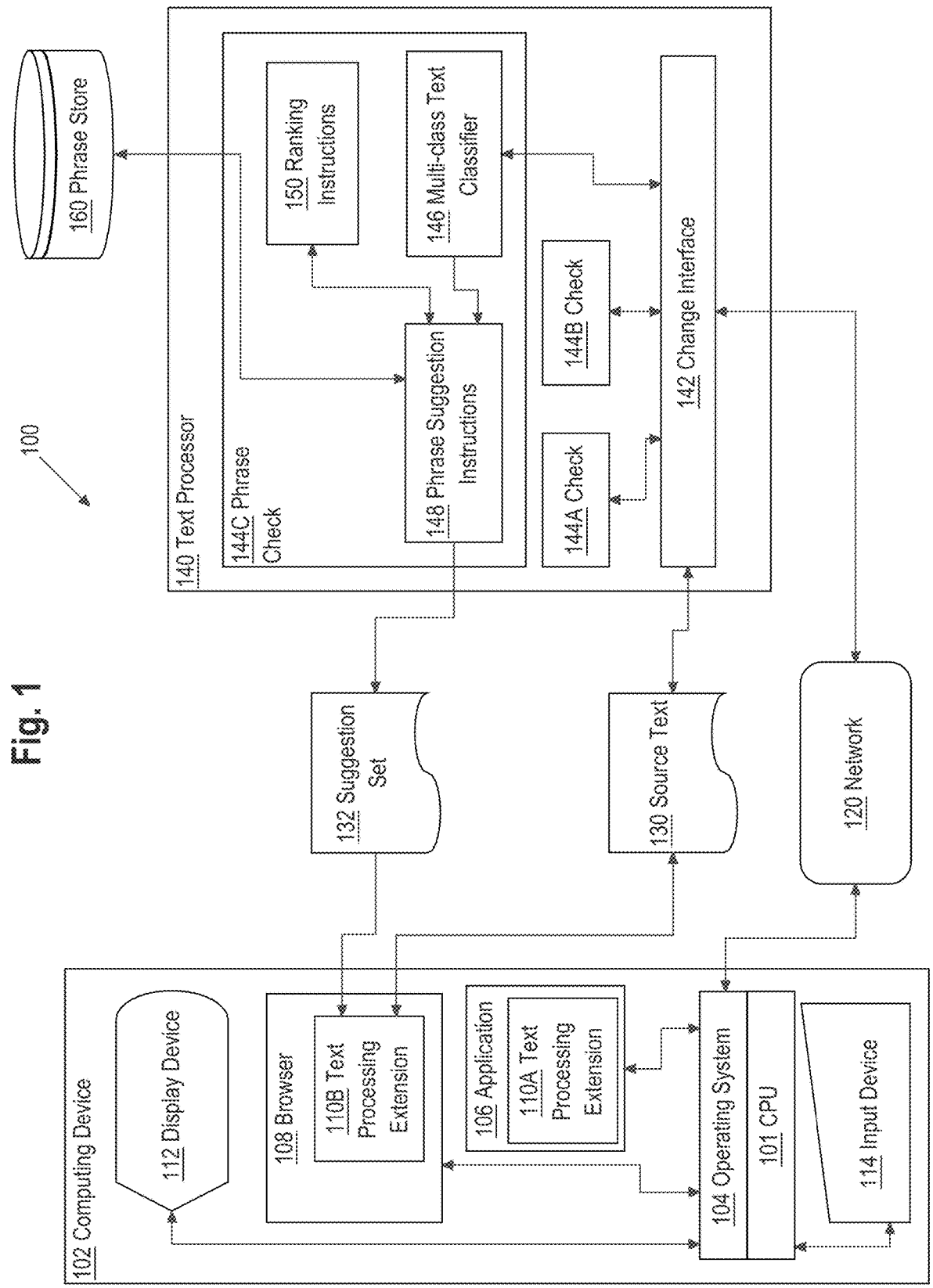
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. General Overview
2. Structural & Functional Overview
3. Implementation Example—Hardware Overview

1. GENERAL OVERVIEW

In an embodiment, a computer-implemented process is programmed to detect a type or category of document that is being drafted and to suggest one or more phrases or sentences to substitute for the original, the suggested text being potentially more personable and sincere than the writer's original text. Suggested text phrases are selected from a large corpus of previously manually drafted sentences and phrases. Selected text phrases are ranked and filtered to result in suggesting a manageable set of text phrases. With this approach, adding specially chosen content to existing content can change the warmth or tone of the text while preserving its meaning. Unlike prior approaches, in an embodiment, the process is programmed to artificially understand the intent of the original text as a basis of suggesting other content to add. Furthermore, embodiments may interoperate with a visual or graphical user interface that is programmed to enable users to see what the change to the text will be and whether they want it before they engage with the suggestion.

In an embodiment, the disclosure provides a computer-implemented method executed at a first computer and comprising: programmatically receiving a digital electronic object comprising a source text; dividing the source text into a plurality of source text units; evaluating each particular source text unit among the plurality of source text units using a machine learning model, and receiving a classification output from the machine learning model that classifies each particular source text unit as a particular category among a plurality of possible categories; transforming the classification output to yield an output set of phrase suggestions; transmitting the output set of phrase suggestions to a second computer. In one feature, the transforming comprises any one of: mapping the classification output to a plurality of candidate phrase suggestions in a digital database, to yield an initial set of matching phrase suggestions, and filtering the initial set of matching phrase suggestions to yield the output set of phrase suggestions that is fewer in number than the initial set; and mapping the classification output to a plurality of candidate phrase suggestions in a digital database, to yield an initial set of matching phrase suggestions, scoring the candidate phrase suggestions, and selecting top N candidate phrase suggestions to yield the output set of phrase suggestions. The plurality of source text units may be a plurality of sentences of the source text. The plurality of source text units may be a plurality of sentences of the source text, the method further comprising executing the dividing using a computer-implemented parser.

In some embodiments, the machine learning model comprises a trained multi-class text classifier comprising a FASTTEXT classifier. In some embodiments, the computer-implemented method further comprises, before the filtering, ranking the initial set of matching phrase suggestions based on a ranking criterion. In some embodiments, the computer-implemented method further comprises, before the filtering, ranking the initial set of matching phrase suggestions in order of least similarity to the particular source text unit.

The machine learning model may be any of: a plurality of text classifiers coupled as an ensemble; a plurality of targeted rules that are programmed to find relevant words and coupled to a classifier to approve or reject whether an instance of a word is correct.

In some embodiments, the computer-implemented method further comprises the first computer executing a text processor that is communicatively coupled to a text processing extension that is executed at the second computer; programmatically receiving the digital electronic object comprising the source text via a message initiated at the text processing extension and transmitted to the text processor; the text processing extension executing in association with an application program that is executing at the second computer, the text processing extension being programmed to automatically detect a change in a text entry window of the application program and, in response, to initiate the message.

In some embodiments, the computer-implemented method further comprises the first computer executing a text processor that is communicatively coupled to a text processing extension that is executed at the second computer; programmatically receiving the digital electronic object comprising the source text via a message initiated at the text processing extension and transmitted to the text processor; the text processor executing in association with a browser that is executing at the second computer, the text processing extension being programmed to automatically detect a change in a text entry widget of the browser and, in response, to initiate the message.

In some embodiments, the trained multi-class text classifier machine learning model is trained to classify each particular source text unit as a particular category from among: thank, happy birthday, ask for help, decline invitation, follow up, congratulate, introduce, apology, announcement, setting up a meeting.

2. STRUCTURAL & FUNCTIONAL OVERVIEW

2.1 Text Suggestion Process

FIG. 1 illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example of FIG. 1, a computing device 102 is communicatively coupled via a network 120 to a text processor 140. In one embodiment, computing device 102 comprises a client-type computing device such as a personal computer, laptop computer, tablet computer, smartphone, or notebook computer. For purposes of illustrating a clear example, a single computing device 102, network 120, and text processor 140 are shown in FIG. 1, but practical embodiments may include thousands to millions of computing devices 102 distributed over a wide geographic area or over the globe, and hundreds to thousands of instances of text processor 140 to serve requests and computing requirements of the computing devices.

Computing device 102 comprises, in one embodiment, a central processing unit (CPU) 101 coupled via a bus to a display device 112 and an input device 114. In some embodiments display device 112 and input device 114 are integrated, for example, using a touch-sensitive screen to implement a soft keyboard. CPU 101 hosts operating system 104, which may include a kernel, primitive services, a networking stack, and similar foundation elements implemented in software, firmware, or a combination. Operating system 104 supervises and manages one or more other programs. For purposes of illustrating a clear example, FIG. 1 shows the operating system 104 coupled to an application 106 and a browser 108, but other embodiments may have more or fewer apps or applications hosted on computing device 102.

At runtime, one or more of application 106 and browser 108 load, or are installed with, a text processing extension 110A, 110B, which comprises executable instructions that are compatible with text processor 140 and may implement application-specific communication protocols to rapidly communicate text-related commands and data between the extension and the text processor. Text processing extensions 110A, 110B may be implemented as runtime libraries, browser plug-ins, browser extensions, or other means of adding external functionality to otherwise unrelated, third-party applications or software. The precise means of implementing a text processing extension 110A, 110B or to obtain input text is not critical provided that an extension is compatible with and can be functionally integrated with a host application 106 or browser 108.

In some embodiments, a text processing extension 110A may install as a stand-alone application that communicates programmatically with either or both of the operating system 104 and with an application 106. For example, in one implementation, text processing extension 110A executes independently of application 106 and programmatically calls services or APIs of operating system 104 to obtain the text that has been entered in or is being entered in input fields that the application manages. Accessibility services or accessibility APIs of the operating system 104 may be called for this purpose; for example, an embodiment can call an accessibility API that normally obtains input text from the application 106 and outputs speech to audibly speak the text to the user, but use the text obtained by the accessibility service in the processes that are described for FIG. 2 and other sections herein.

In some embodiments, each text processing extension 110A, 110B is linked, loaded with, or otherwise programmatically coupled to or with one or more of application 106 and browser 108 and, in this configuration, is capable of calling API calls, internal methods or functions, or other programmatic facilities of the application or browser. These calls or other invocations of methods or functions enable each text processing extension 110A, 110B to detect text that is entered in input fields, windows, or panels of application 106 or browser 108, instruct the application or browser to delete a character, word, sentence, or another unit of text, and instruct the application or browser to insert a character, word, sentence, or another unit of text.

Each of the text processing extensions 110A, 110B is programmed to interoperate with a host application 106 or browser 108 to detect the entry of text in a text entry function of the application or browser and/or changes in the entered text, to transmit changes in the text to text processor 140 for server-side checking and processing, to receive responsive data and commands from the text processor, and to execute presentation functions in cooperation with the host application or browser.

As one functional example, assume that browser 108 renders an HTML document that includes a text entry panel in which a user can enter free-form text describing a product or service. The text processing extension 110B is programmed to detect user selection of the text entry panel, the entry of text or changes in the text within the panel, and to transmit all such text changes to text processor 140. In an embodiment, each text processing extension 110A, 110B is programmed to buffer or accumulate text changes locally over a programmable period, for example, five seconds, and to transmit the accumulated changes over that period as a batch to text processor 140. Buffering or accumulation in this manner, while not required, may improve performance by reducing network messaging roundtrips and reducing the likelihood that text changes could be lost due to packet drops in the networking infrastructure.

A commercial example of text processing extensions 110A, 110B is the GRAMMARLY extension, commercially available from Grammarly, Inc. of Kyiv, Ukraine.

Network 120 broadly represents one or more local area networks, wide area networks, campus networks, or inter-networks in any combination, using any of terrestrial or satellite, wired, or wireless network links.

In an embodiment, the text processor 140 comprises one or more server computers, workstations, computing clusters, and/or virtual machine processor instances, with or without network-attached storage or directly attached storage, located in any of enterprise premises, private datacenter, public datacenter and/or cloud computing center. Text processor 140 broadly represents a programmed server computer having processing throughput and storage capacity sufficient to communicate concurrently with thousands to millions of computing devices 102 associated with different users or accounts. For purposes of illustrating a clear example and focusing on innovations that are relevant to the appended claims, FIG. 1 omits basic hardware elements of text processor 140 such as a CPU, bus, I/O devices, main memory, and the like, illustrating instead an example software architecture for functional elements that execute on the hardware elements. Text processor 140 also may include foundational software elements not shown in FIG. 1, such as an operating system consisting of a kernel and primitive services, system services, a networking stack, an HTTP server, other presentation software, and other application software. Thus, text processor 140 may execute at a first computer, and text processing extensions 110A, 110B may execute at a second computer.

In an embodiment, text processor 140 comprises a change interface 142 that is coupled indirectly to network 120. Change interface 142 is programmed to receive the text changes that text processing extensions 110A, 110B transmit to text processor 140, and to distribute the text changes to a plurality of different checks 144A, 144B, 144C. To illustrate a clear example, source text 130 of FIG. 1 represents one or more text changes that text processing extension 110B transmits to change interface 142. In an embodiment, change interface 142 is programmed to distribute each and every text change arriving from a text processing extension 110A, 110B to all of the checks 144A, 144B, 144C, which execute in parallel and/or in independent threads.

Thus, in one embodiment, the text processor 140 may be programmed to programmatically receive a digital electronic object comprising a source text, a message with the source text, an application protocol message with the source text, an HTTP POST request with the source text as a payload, or using other programmed mechanics. In various embodiments, the first computer executes a text processor that is communicatively coupled to a text processor extension that is executed at the second computer and programmatically receives the digital electronic object comprising the source text via a message initiated at the text processor extension and transmitted to the text processor; and/or the text processor extension executes in association with an application program that is executing at the second computer, the text processor extension being programmed to automatically detect a change in a text entry window of the application program and, in response, to initiate the message; and/or the text processor executes in association with a browser that is executing at the second computer, the text processor extension being programmed to automatically detect a change in a text entry widget of the browser and, in response, to initiate the message.

Each of the checks 144A, 144B, 144C is programmed to execute a different form of checking or processing of a text change that has arrived. Example functions that checks 144A, 144B could implement include grammar checking, tone detection, and translation. In an embodiment, check 144C is programmed as a phrase check, and therefore it is also denoted "phrase check 144" in this description. In an embodiment, phrase check 144 comprises a multi-class text classifier coupled to phrase suggestion instructions 148, which are coupled to ranking instructions 150; however, other machine learning models can be used. For example, an embodiment may use a number of individual text classifiers ensembled together, or targeted rules may be programmed to find relevant words and then coupled to a classifier to approve or reject whether the instance of a word is correct, thus using a coarse rule followed by ML-based filtering.

Furthermore, phrase check 144C is coupled to or can access, a phrase store 160, which may be integrated with text processor 140 or implemented as separate storage. In an embodiment, phrase store 160 comprises a database, flat file system, object store, or another digital data repository that stores a large number of textual phrase suggestions, in association with category values or tags that specify a category or type of communication, text, or document in which the suggestions could be substituted. Thus, phrase check 144 and/or text processor 140 may be programmed for evaluating each particular source text unit among the plurality of source text units using a trained multi-class text classifier machine learning model and receiving a classification output from the multi-class text classifier that classifies each particular source text unit as a particular category among a plurality of possible categories.

Figure 2:
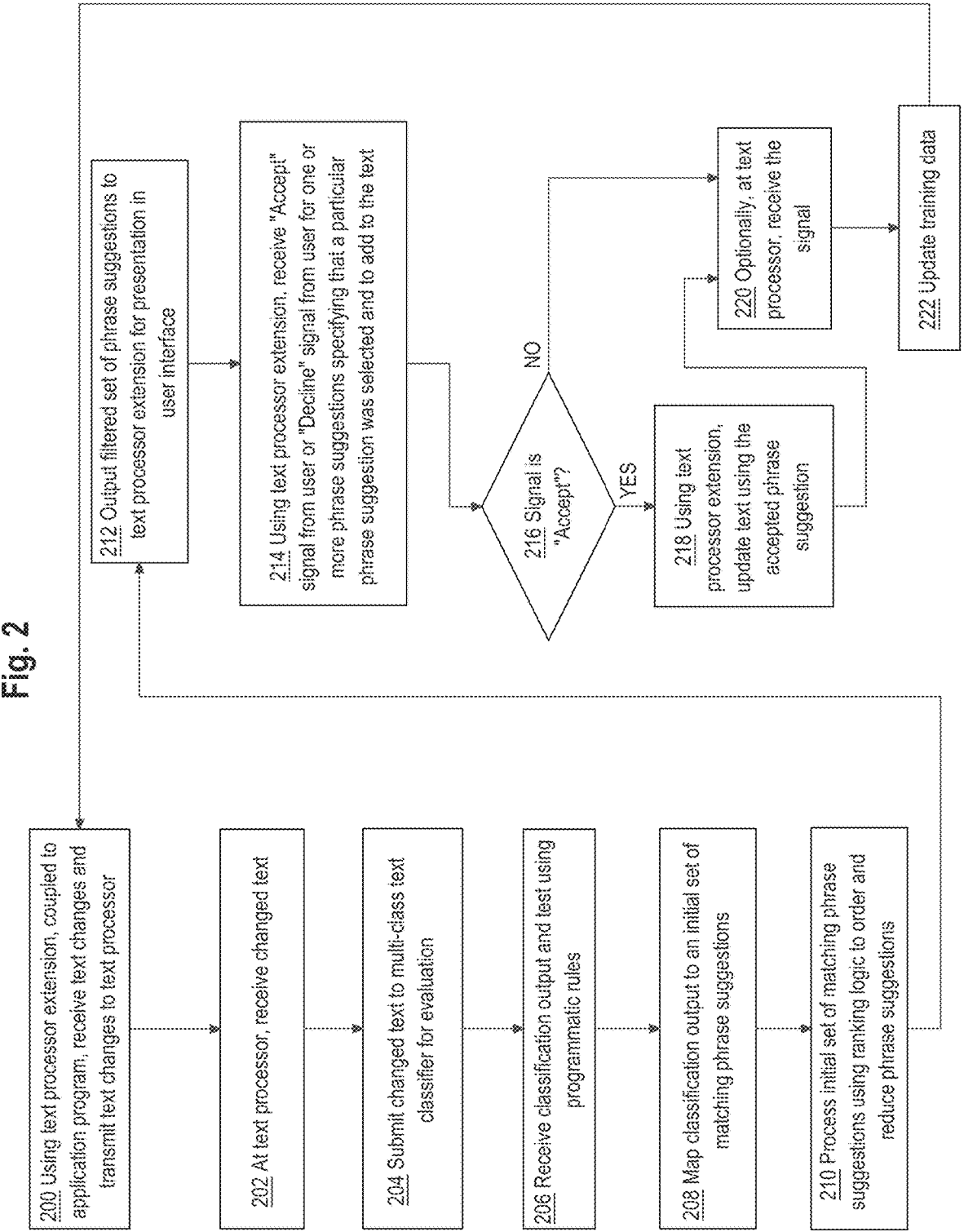
FIG. 2 illustrates a computer-implemented process of classifying a source text, determining phrase suggestions, and presenting the phrase suggestions, in one embodiment.

As further described herein for FIG. 2, in an embodiment, phrase suggestion instructions 148 are programmed, in part, to output a suggestion set 132 to transmit to text processing extension 110B.

FIG. 2 illustrates a computer-implemented process of classifying a source text, determining phrase suggestions, and presenting the phrase suggestions, in one embodiment. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program, but are provided at the same functional level of illustration that is normally used at the high level of skill in this art to communicate the basis of developing working programs.

At step 200 of FIG. 2, in an embodiment, using a text processing extension coupled to an application program, the process receives text changes and transmits the text changes to a text processor. For example, as described for FIG. 1, each text processing extension 110A, 110B is programmed to transmit any change in the text to text processor 140. Thus, invocation of the process of FIG. 2 occurs in response to a user drafting text in application 106 (FIG. 1) or browser 108, based upon a text processing extension 110A, 110B detecting a change in source text 130 entered at the application or browser and transmitting the source text to change interface 142 of text processor 140 for evaluation using checks 144A, 144B, 144C.

At step 202, at the text processor, the changed text is received. In some embodiments, the text processor 140 is implemented as a back-end server and is programmed to distribute the text changes to a plurality of modules that are programmed to execute multiple types of checks on the text, and the process of FIG. 2 is implemented as one of the checks. For example, source text 130 is received at phrase check 144 via change interface 142.

In an embodiment, the process of FIG. 2 is programmed first to detect that a suggestion should be given, then selects one or more suggestions to provide. In one approach for detection that a suggestion should be given, phrase check 144 is programmed to form vectors that represent sentences and the surrounding context of source text 130, then searches for matching vectors in a labeled dataset that is digitally stored in phrase store 160. The matching may use fuzzy similarity algorithms. In this manner, the text processor may be programmed for dividing the source text into one or more source text units, and one example of the source text unit is a sentence. The dividing may use a parser or other programmed algorithm capable of inspecting natural language text, identifying tokens or units of the text, identifying syntactic units, and so forth. Other units may be used in other embodiments including clauses, multi-sentence groups, paragraphs, and so forth.

Alternatively, a machine learning model, structured as a text classifier, is trained on a large corpus of source sentences and then used to evaluate a current sentence, outputting a classification of where to inject a suggestion. For example, at step 204, the changed text is submitted to a multi-class text classifier for evaluation. Referring to FIG. 1, source text 130 may be programmatically transmitted to multi-class text classifier 146. In one embodiment, text classifier 146 implements a multi-class machine learning model capable of outputting a plurality of different label values, each label value representing a type or category of intent represented in the source text.

In one experimental implementation, text classifier 146 has been programmed to support ten types and to output, for each sentence, label values of "0" to "9" which respectively correspond to thank, happy birthday, ask for help, decline invitation, follow up, congratulate, introduce, apology, announcement, setting up a meeting. In some embodiments, the phrase suggestion instructions 148 are programmed to generate phrase suggestions for fewer than all the intents that the text classifier 146 can label. That is, the text classifier may generate label values for certain intents as noted above, but phrase suggestions will not be offered for those intents. Whether phrase suggestions are offered for every intent or label value depends on whether phrase store 160 has been loaded with phrase suggestions for every intent.

In an embodiment, text classifier 146 may be programmed using the FASTTEXT model library authored by Facebook, Inc., and summarized at the time of this disclosure in the folder /tools/fasttext of the internet domain "ai.facebook.com". In experimentation, the inventors determined that FASTTEXT, as supplied by FACEBOOK, does not generalize well without loss of precision when previously unseenlabels are processed. In one experiment, FASTTEXT was integrated into a working implementation via these steps:

1. Manually author a small set of target-like sentences.
2. Use Universal Sentence Encoder to find semantically-related sentences from a large random text corpus.
3. Perform human annotation to validate the selected sentences in being truthful to the definition of target intent.
4. Use the validated data as the training dataset for the FASTTEXT classifier.

In another experiment, acceptable results were obtained using FASTTEXT embeddings as a metric of semantic distance between training sentences and user-input sentences under evaluation. Various sources of data for training were evaluated, such as news headlines as a substitute for sentences indicating intent, and ultimately a training dataset of specific intent samples was manually prepared and input. TABLE 1 provides an excerpt of intent samples that could be used in an embodiment.

Table 1—Example Intent Training Dataset

```
intent_samples = [
  [
  "Thank you for a fruitful meeting earlier today. ",
  "I especially appreciate your offer to connect me with others in your network.",
  "We just wanted to THANK YOU for everything you did for her this year",
  "We want to take this opportunity to thank you for all of your hard work and effort
as of late.",
  "I wanted to personally take this time to thank you for your willingness to engage
with me over these last couple of months.",
  ],
  [
  "Please do accept our sincere apologies and provide us with another opportunity to
redeem ourselves as a viable service provider.",
  "I would like to offer my deepest apologies, I genuinely forgot to complete the
homework, after I finished creating notes for one course it completed slipped my
mind and I assumed I had finished chemistry work.",
  "I am sorry for leaving the call yesterday before the meeting was over.",
  ],
  [
  "Yes let's meet next week, do you want to meet Monday? ",
  "Perfect, let's meet on {February 15th} at 09:15 (Local time). ",
  "Let's meet tomorrow at 12 pm in the office to fix the timeline so as we can meet
the deadline. ",
  "I just wanted to reach out to you guys to set up a meeting where we can all meet.",
  ],
  [
  "I just want to confirm whether you received my last email or not."
  "Please confirm if we can include this article in today's report with available
content?",
  "Also, we talked about the ability to dock a small boat there at the pier. I would
like to verify the exact cost of this.",
  "Just confirming, are we still on time for the delivery of this load?",
  ],
  [
  "Hi, confirming that I have still not received a refund per email trail, please
advise.",
  "I can confirm that the migration of the product to {Cloud Service Provider} has
been successful.",
  ]
]
```

APPENDIX 1 is a copy of a JUPYTER notebook that documents a first example of preparing and training a machine learning model that can be used in one embodiment.

APPENDIX 2 is a copy of a JUPYTER notebook that documents a second example of preparing and training a machine learning model that can be used in one embodiment.

APPENDIX 3 is a copy of a JUPYTER notebook that documents an example of retraining a machine learning model that can be used in one embodiment.

Each of APPENDIX 1, APPENDIX 2, APPENDIX 3 forms a part of the present specification and/or disclosure. To the extent that APPENDIX 1, APPENDIX 2, APPENDIX 3 are deemed separate documents, each and every one of APPENDIX 1, APPENDIX 2, APPENDIX 3 is hereby incorporated by reference as if fully set forth herein.

All of APPENDIX 1, 2, 3 are based on FASTTEXT. As an alternative to FASTTEXT, a very deep convolutional neural network (VDCNN) can be used. Experimental implementations also have used embedding of sentences with multiple feed-forward layers in a CNN.

Phrase store 160 digitally stores a plurality of different sentences, clauses, or phrases, each stored in association with a label value corresponding to one or more of the label values that text classifier 146 can output. Phrase store 160 may use relational database tables, non-relational tables, flat files, or other forms of digital data storage to store sentences, clauses, or phrases with label values. In some embodiments, the sentences, clauses, or phrases are manually prepared and manually labeled. For example, analytical linguists or copywriters can draft high-quality phrase suggestions for storing in phrase store 160.

Additionally or alternatively, sentences, clauses, or phrases may be synthesized, or generated programmatically, under stored program control by using a sentence similarity processor to receive an input sentence and to generate output synthetic data for phrase store 160. For example, text semantic similarity can be processed using open-source software available from GOOGLE using TENSORFLOW HUB and DATAFLOW, as described in the article "analyzing-text-semantic-similarity-using-tensorflow-and-cloud-dataflow" which is available at the time of this disclosure in the folder /architecture of the internet domain cloud.google.com. Furthermore, similar programmatic techniques may be used to synthesize a plurality of sentences, clauses, or phrases to supplement a training dataset with which the text classifier 146 is trained.

Referring again to FIG. 2, at step 206, the classification output is received and tested using a plurality of programmatic rules that test whether a particular phrase lacks a subordinate clause with more details, whether a phrase occurs in a prominent position of the source text 130, whether the phrase occurs under negations, whether the phrase has a correct sequence of words and structure, and so forth. Thus, in an embodiment, the process of FIG. 2 is programmed to ensure that the detection results are accurate and useful.

At step 208, the process is programmed to map the classification output to an initial set of matching phrase suggestions, for example, in a plurality of candidate phrase suggestions that are stored in a digital database. Thus, after detection of qualifying sentences, phrases, or clauses in source text 130, the process determines which phrases to suggest, selected from a large plurality of candidate phrase suggestions in phrase store 160. Step 208 may include generating and submitting a query to phrase store 160 to select a result set of all stored phrases having label values that match an output label value from text classifier 146.

However, the result set may contain too many candidate phrases to present in a user interface of the application 106 or browser 108 (FIG. 1). Therefore, in an embodiment, at step 210, the process is programmed to process the initial set of matching phrase suggestions using ranking instructions 150 to order the phrase suggestions and filter or reduce the phrase suggestions to a reduced-size set, comprising an output set of phrase suggestions that is fewer in number than the initial set. In some embodiments, filtering is executed first, for example, to select the first five or ten candidate phrases from the result set, and then ranking is used. Alternatively, filtering to five or ten candidate phrases can be executed without ranking.

In some embodiments, approaches other than mapping followed by filtering may be used at step 208, step 210. For example, instructions may be programmed to score the candidate phrase suggestions, for example, using an ElasticSearch information retrieval score, and to select the top N candidates, without a need for a filtering step. The value "N" may vary in different embodiments; example values are "1" to "10" or any integer within a range of "1" to "10".

The ranking instructions 150 may be programmed to rank the initial set of phrase suggestions according to any useful ranking criterion such as similarity to a source text unit, dissimilarity, popularity across a community of users, or other criteria. In one ranking approach, step 210 is programmed to order the result set of phrase suggestions in inverse order of similarity to the source text 130. Ordering in inverse order of similarity can avoid presenting, to the user, a suggestion that is too similar to the source text 130. To support this step, in an embodiment, the result set of candidate phrases obtained at step 208 can be submitted in real-time to a sentence similarity processor to receive, in return, a similarity value for each candidate phrase that reflects a degree of similarity to the source text 130. Or, ranking instructions 150 may be programmed to calculate, in real-time, a set similarity value between n-grams that are present in source text 130 and each candidate phrase of the result set; the resulting set similarity values may be programmatically provided to phrase suggestion instructions 148 for presentation, in suggestion set 132, in order of lowest similarity first. The result set of candidate phrase suggestions received from phrase store 160 may comprise multiple similar variants. Examples include "I am grateful" and "I am very grateful".

In an embodiment, the effect of ranking instructions 150 when programmed as just described is to avoid placing such similar variants in suggestion set 132 so that variants are near to one another in order when presented in the application 106 or browser 108 via the text processing extensions 110A, 110B. To enhance this effect, ranking instructions 150 and/or phrase suggestion instructions 148 may be programmed using a clustering approach. For example, candidate phrase suggestions of the result set may be divided into a plurality of different groups by executing a clustering algorithm on the result set to result in grouping similar phrase suggestions. One cluster might include all phrases expressing gratitude, for example. Five or six clusters could be used, for example, and ranking instructions 150 and/or phrase suggestion instructions 148 may be programmed to conduct ranking as previously described and then select the highest-ranked phrase from each cluster successively to form a final set of phrase suggestions for output as the suggestion set 132.

In an embodiment, source text 130 may comprise a plurality of different sentences each yielding different label values for different types or different categories when the sentences are processed using the text classifier 146. In an embodiment, phrase suggestion instructions 148 are programmed to generate phrase suggestions only for a first label value that is initially output from text classifier 146 for a first sentence that is processed. Or, in an embodiment, the text classifier 146 is programmed to process all sentences that are present in source text 130, resulting in outputting a plurality of different label values; phrase suggestion instructions 148 may be programmed to select one label value, using pseudorandom selection, from among all the label values and then select candidate phrase suggestions only for the selected single label value.

At step 212, the process is programmed to output a filtered set of phrase suggestions to the text processing extension for presentation in a user interface, for example, at a mobile computing device or another computing device that hosts or executes the text processing extension. Step 212 may include filtering the initial set of matching phrase suggestions, for example, to select only the top N matching phrase suggestions, based on the ranking. N may have a range of values depending on the display capabilities of the mobile computing device or another computing device that hosts or executes the text processing extension or depending upon the size of a graphical user interface panel, widget, or another visual element in which the suggestions are to be displayed. In one embodiment, the range of N is from one to ten, but other ranges could be used in different embodiments and the specific value of N is not critical.

At this stage, the text processing extension, at the mobile computing device or another computing device, may be programmed to output a display of the filtered set of phrase suggestions that have been received at the text processing extension via step 212. Output may comprise displaying a list of the filtered phrase suggestions, instantiating a window, panel, or widget within a graphical user interface, or similar visual output. The specific means of output is not critical provided that some means is provided to a user, of the mobile computing device or another computing device that hosts or executes the text processing extension, to view and consider whether to select one of the phrase suggestions.

Figure 3:
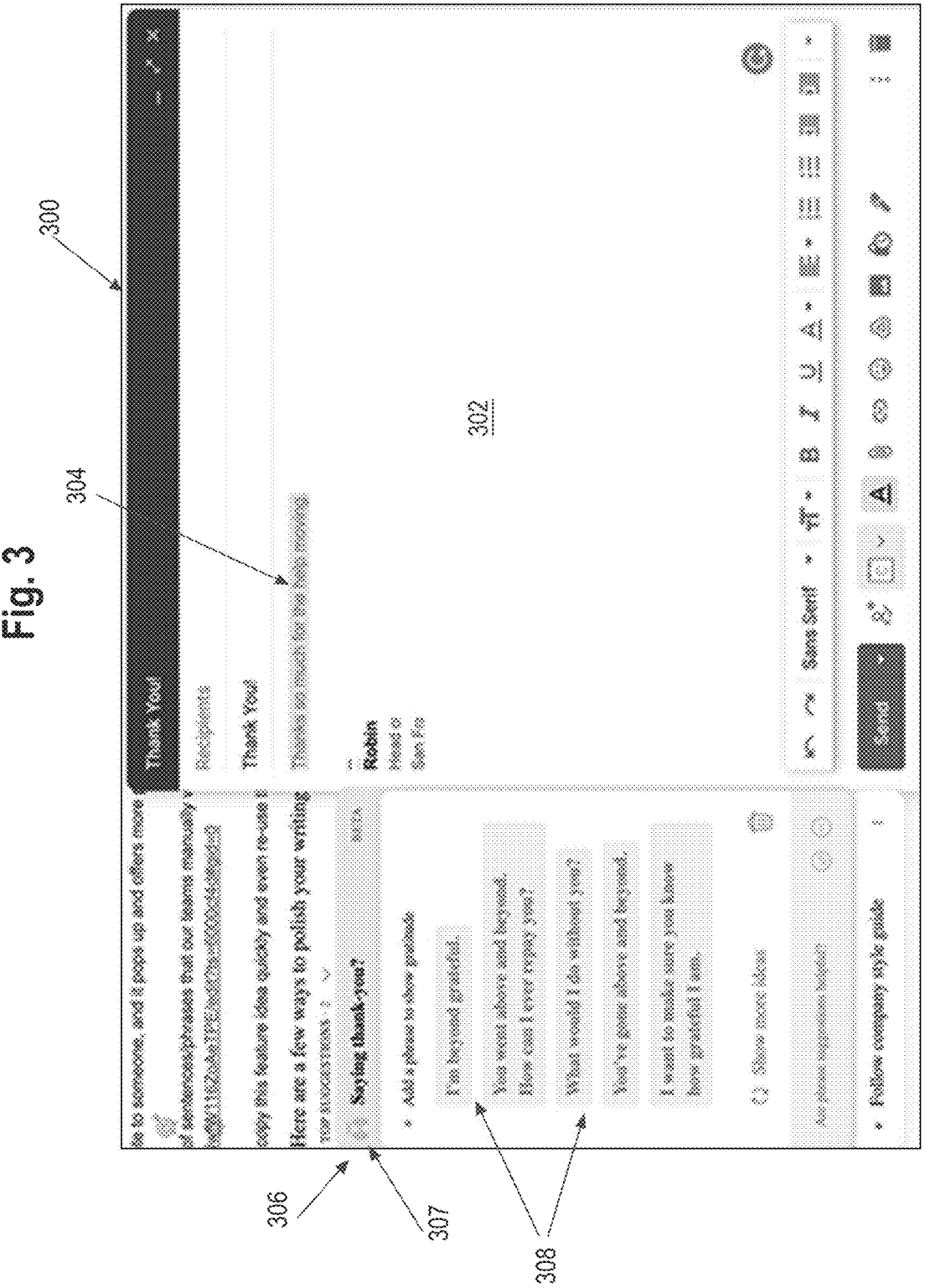
FIG. 3 illustrates an example of a graphical user interface that may be programmed to display phrase suggestions in conjunction with an application.

FIG. 3 illustrates an example of a graphical user interface that may be programmed to display phrase suggestions in conjunction with an application. In FIG. 3, a graphical user interface (GUI) window 300 is displayed in the ordinary operation of an application program, browser, or other program executed at a second computer, such as a mobile computing device. In an embodiment, an application running with GUI window 300 provides electronic mail (email) composing functions and has instantiated a sub-window 302 which shows, in FIG. 3, a portion of an email that is undergoing composition. The sub-window includes a Recipients list, a subject of "Thank You!" in this example, and a source text unit 304 which states, in this example, "Thanks so much for the help moving."

In response to input at the second computer entering the source text unit 304, a text processing extension 110A, 110B is programmed to instantiate and cause displaying a second sub-window 306 that comprises a header bar 307 and a plurality of output phrase suggestions 308. The text processing extensions 110A, 110B may be programmed to use system calls, function calls, method calls, or other programmatic means to instantiate sub-windows and cause labels and data to be displayed. In this example, the header bar 307 states "Saying thank-you?" to indicate that the multi-class text classifier has classified the source text unit 304 as a "Thank you" phrase. The output phrase suggestions 308 each correspond to the same sentiment, category, or class as the source text unit 304, based on the classification and mapping steps that have been previously described. In an embodiment, each of the output phrase suggestions 308 is output as a selectable hyperlink which, when selected, causes the text processing extension 110A, 110B to execute a call to delete the source text unit 304 in the sub-window 302 and to insert the selected output phrase suggestion 308.

At step 214, the process is programmed to receive, using the text processing extension, a signal from a user of the mobile computing device or the other computing device that hosts or executes the text processing extension to accept or decline one or more of the phrase suggestions, specifying that a particular phrase suggestion was selected to add to the text. For purposes of illustrating a clear example, step 214 and aspects of this description use the labels Accept and Decline to refer to input signals that could be received at step 214 or other steps, but these labels are merely examples and different implementations may use other internal values to identify different input.

At step 216, the process is programmed to determine whether an Accept signal or equivalent, was received as input. If step 216 is FALSE or NO, then control transfers to step 220 at which, optionally, the text processor may receive the signal, for example, a Decline signal. At step 222, the process may be programmed to update training data, used to train the multi-class text classifier, based on the signal. Thus, steps 216, 220, 222 may form a feedback loop by which training data is continuously updated based on user signals to indicate whether a particular phrase suggestion was correct, or useful, or not.

If step 216 is TRUE or YES, then at step 218, the process is programmed to update, using the text processing extension, the source text using the accepted phrase suggestion. Updating may comprise, for example, the text processing extension programmatically invoking an API call, internal method, or other programmed function, of the browser or app that the text processing extension extends, to insert the phrase suggestion into the source text, or to delete the original sentence and insert the phrase suggestion. Control then transfers to step 220, which is processed as described above.

The approaches disclosed herein provide efficient technical means for automatically updating a text that has been written using computer support. Unlike past approaches, the intent of a source text may be detected programmatically and then used to drive automatic machine selection of candidate phrase suggestions, with ranking if appropriate to eliminate candidate phrase suggestions that are too similar to one another. An ancillary benefit is that the accuracy, tone, and clarity of written communication may be improved with computer assistance. The approaches herein provide efficient machine assistance to individuals who are not naturally strong writers in finding text that accurately reflects the original intent of their draft text.

2.2 TEXT ADDITION PROCESS

Other sections herein have described computer-implemented, programmatic techniques for analyzing a text and extracting an intent of the writer through machine-learning techniques, then suggesting an alternative text that may be more personable and sincere than the original text. In an embodiment, the phrase check 144C may be programmed to suggest additions to an existing text rather than suggesting an alternative text.

The embodiments generally seek to provide machine learning approaches to programmatically assist a writer to find the right words for important text or occasions. Embodiments proceed from the rationale that a well-written introduction can help create a connection that will last for years, a heartfelt note of appreciation can reinforce a relationship, or proper apology can save a friendship. When situations like these arise, writers want to put forth their best writing. Furthermore, with remote collaboration becoming the norm for many people, more and more conversations have moved online to a written, asynchronous format. But in this format, due to the lack of body language, facial expressions, or the rapport of a flowing conversation, communicating with warmth and empathy can be challenging. Yet these are the things that help create lasting, fulfilling human connections. In an embodiment, machine learning models are trained to evaluate text and make it more gracious, kind, and understanding. For certain types of writing-high-stakes, important occasions-writers need the most help sounding warm and empathetic. Machine learning techniques are used to identify these writing types, and based on the identified writing types, provide suggestions that may be more personable and sincere than the original text. Examples of important writing categories include notes of appreciation, birthday greetings, congratulations messages, requests for help and follow-ups, and apologies.

Many potential ways exist to imbue a message with more warmth and empathy. In an embodiment, rather than programmatically altering the original text, phrase check 144C is trained and programmed to suggest additions to the existing text. Examples include:

Thanks for your hard work. [I truly appreciate it.]
Congrats on the promotion! [Well deserved!]
What should I do? [You always have great advice.]

The machine-generated additional texts are shown in brackets above. This approach has several benefits over other approaches. First, it greatly reduces the possibility of introducing a change in the writer's meaning. Second, it provides transparency concerning over what suggestions the system makes and why, which may provide benefits over the less-transparent techniques that uses deep-learning text generation or paraphrasing.

Figure 5B:
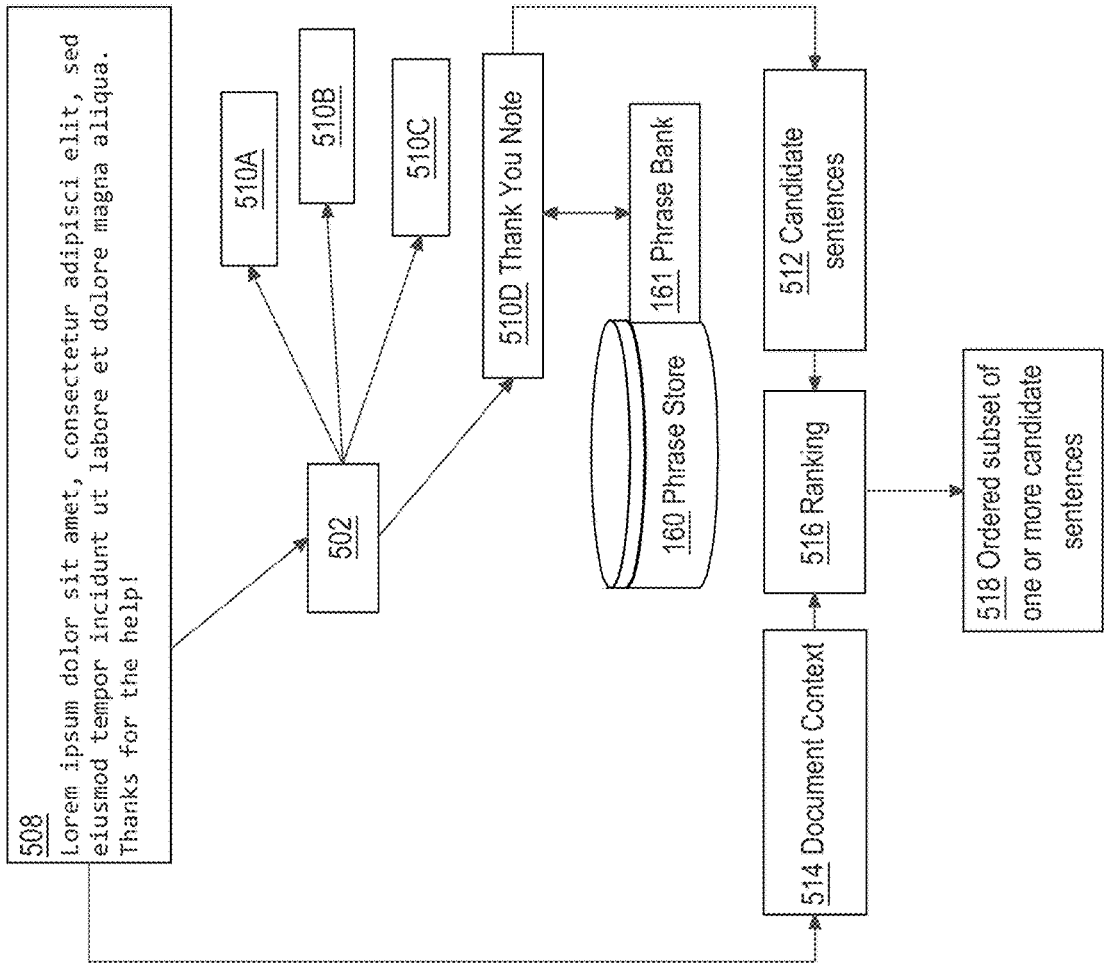
FIG. 5B illustrates an example data flow that could occur during execution of FIG. 5A.
Figure 5A:
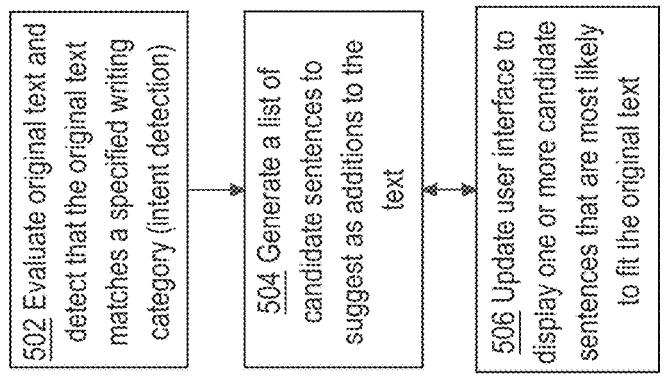
FIG. 5A illustrates a programmable process of suggesting additional text, according to one embodiment.

FIG. 5A illustrates a programmable process of suggesting additional text, according to one embodiment. FIG. 5B illustrates an example data flow that could occur during execution of FIG. 5A. In an embodiment, phrase check 144C may be programmed according to the process shown in FIG. 2, adapted to embody or incorporate the steps of FIG. 5A. Thus, for purposes of illustrating a clear example, FIG. 5A does not include all steps of a complete method, function, or program, and could include compatible steps of FIG. 2.

Referring first to FIG. 5A, at block 502, phrase check 144C is programmed to evaluate an original text and to detect when the original text matches a specified or pre-defined writing category. Block 502 also may be denoted as intent detection. For example, referring to FIG. 5B, an input text 508 can be received at block 502 and evaluated in comparison to categories 510A, 510B, 510C, 510D, for example, using a machine learning classifier. Each of the categories 510A, 510B, 510C, 510D, for example, can correspond to one of: notes of appreciation, birthday greetings, congratulations messages, requests for help and follow-ups, and apologies. Other embodiments can implement more or fewer categories. Since input text 508 contains the phrase "Thanks for the help!", assume for purposes of an example that block 502 results in associating the input text with category 510D, "Thank You Note."

At block 504, phrase check 144C is programmed to generate a list of candidate sentences to suggest as additions to the text. Block 504 can comprise generating output from a trained machine learning model. For example, category 510D can trigger retrieving or accessing a set of candidate sentences 512 that relate to "Thank You Note."

At block 506, phrase check 144C is programmed to update a user interface to show one or more candidate sentences that are most likely to fit with the text. As shown in FIG. 5B, block 506 can comprise programmatically transmitting the candidate sentences 512 to a ranking function 516, which also receives input concerning document context 514; the ranking function can be programmed to apply a plurality of heuristics to the candidate sentences and document context and to generate an ordered subset of one or more candidate sentences 518. Typically the subset will be three or four sentences from among the candidate sentences 512.

Intent detection at block 502 can be programmed to implement a plurality of algorithmic steps. In one embodiment, intent detection is programmed to determine whether to consider the entire text or part of it. Whole-document intent detection can create unnecessary ambiguity: the text can have multiple intents, or no clear intent. Therefore, in one embodiment, block 502 is programmed to execute sentence-level intent detection. Working at the sentence level enables delivering more granular suggestions that are more likely to be useful, and needs less data to train a model.

Intent detection at block 502 can be implemented using a machine learning classifier that has been trained using a training dataset. The types of intent that embodiments detect may appear only rarely in general writing. One approach to preparing a training dataset is to annotate a massive number of sentences to achieve a dataset size suitable for training a classifier, which can be a slow and expensive process. Alternatively, a two-step, more efficient approach is possible. In a first step, an unsupervised machine learning model can execute to build up a dataset of sentences that represent an intent. For example, a data scientist can create and digitally store a seed set of training data, a specific example of which may be a plurality of different ways of saying ""thank you."" Then a random sample of text is scanned programmatically to identify sentences that are semantically similar to those in the seed set. The identified sentences are likely to express the same or similar intent. The foregoing steps can repeat until a sufficient number of examples are created and stored.

Not all of the example sentences will genuinely express the intent. Therefore, in a second step, the training dataset is annotated. The annotation is more concise because the dataset doesn't contain many neutral sentences to assess. The dataset primarily comprises sentences that represent the intent. The completion of labeling yields a dataset capable of use in a fast and scalable supervised learning approach for text classification.

Generating candidate sentences at block 504 also can comprise a plurality of programmed steps. One approach is to use a large language model for text generation, but generating high-quality phrases can be difficult with such an approach. Alternatively, in an embodiment, based on the expertise of analytical linguists, phrase store 160 (FIG. 1) can be configured to include a plurality of phrase banks 161 (FIG. 5B) that offer a variety of warm and empathetic suggestions for each situation. A phrase bank 161 can be configured to comprise a table in a relational database that implements the phrase store 160, each table being associated with a different particular category among categories 510A, 510B, 510C, 510D.

In an embodiment, to avoid overwhelming the user, phrase check 144C is programmed at blocks 504, 516, 518, to suggest just a few phrases from our bank-phrases that are both relevant and diverse. To ensure that the subset 518 comprises diverse sentences, block 504 can be programmed to cluster similar phrases in the bank 161 and select a limited number of the candidate sentences 512 from each cluster. In an embodiment, to address relevancy, block 504 can be programmed to select phrases that do not repeat the content of a sentence of the original text 508, but add to the original sentence, and ranking function 516 can be programmed for ranking candidate sentences by dissimilarity in comparison to the sentence of the original text. Phrase check 144C also can be programmed to track the performance of each phrase to promote the best phrases overall and demote or even remove ones that users do not select as often, based on processing user signals as described for block 214, block 216, block 218, block 220, block 222 (FIG. 2).

In an embodiment, phrase check 144C can implement a plurality of sub-categories to avoid outputting anomalous suggestions. An example of a suggestion that is appropriate for some, but not all, "congratulation" contexts is:

Congratulations on baby Charlie! [Well deserved.]

where [Well deserved] is a suggestion that is inappropriate for the context. Embodiments can be programmed to address the fact that for some kinds of intents, a set of generic sentence suggestions may not be applicable in all contexts. As a remedy, embodiments create subcategories for such intents. For example, intent category corresponding to "Thank you" messages can be further divided into subcategory "Thank you for the support" or subcategory "Thank you for the understanding." Subcategories can mitigate the risk of providing inappropriate suggestions, and help make suggestions that are better suited for the context. For example, rather than: Congratulations on baby Charlie! [Excited for you.] an embodiment can be programmed to output: . . . we could now say something more fitting: Congratulations on baby Charlie! [Cheers to you and your growing family.]

The sub-categories can be identified based on user feedback. Detecting a particular sub-category can be programmed by first detecting a general intent, then applying programmed rules to determine whether a sentence and the general intent best match a particular sub-category detection.

Figure 6A:
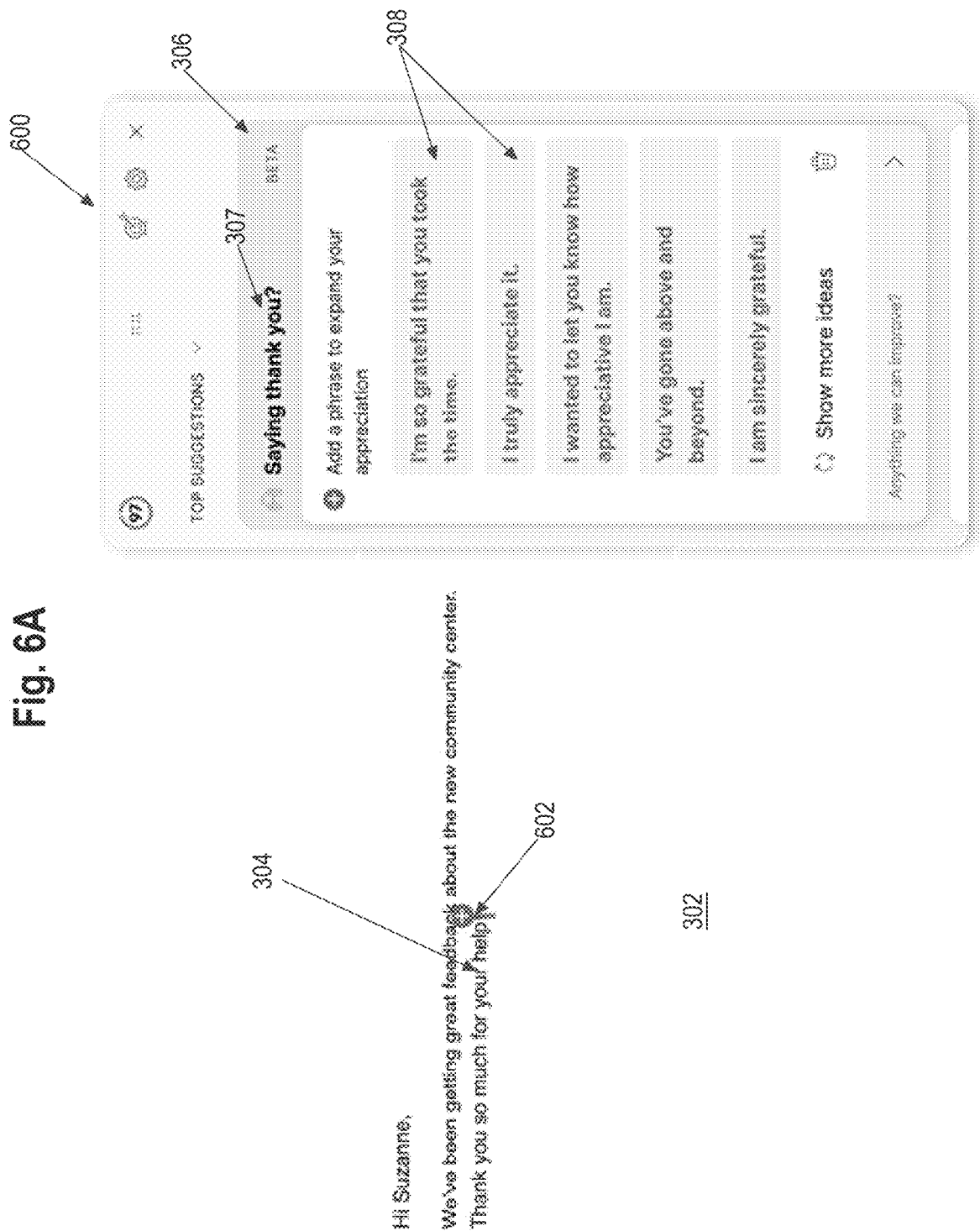
FIG. 6A illustrates a GUI window of suggestions that is displayed in a position that is near or adjacent to, but visually separate from, a sub-window which shows a portion of an email that is undergoing composition.

As shown in FIG. 2, block 212, and FIG. 5A, block 506, in an embodiment, the list of candidate sentences produced at block 504 and/or the ordered subset 518 is presented in a user interface. In one embodiment, suggestions of the form shown in FIG. 3 can be used. Alternatively, phrase check 144C can be programmed to generate presentation instructions, which when rendered in a graphical user interface, provide a display of the form of FIG. 6A. In FIG. 6A, a GUI window 600 comprises elements 302, 304, 306, 307, 308 as described herein for FIG. 3. The GUI window 600 is displayed in a position that is near or adjacent to, but visually separate from, a sub-window 302 which shows a portion of an email that is undergoing composition. For example, the GUI window 600 can be generated and displayed to the side, above, or below the sub-window 302, using window drawing or display functions that present the GUI window as logically and visually separate from the sub-window.

Furthermore, an addition cursor 602 is displayed at a point in the source text unit 304 at which additional text will be inserted if the user accepts one of the output phrase suggestions 308. In some embodiments, instructions to generate the addition cursor 602 can be formatted to cause displaying the addition cursor in a distinctive form or color, including ones that imply the function of adding text. For example, the addition cursor 602 can be displayed as a small green plus (+) sign and cursor to communicate that one of the phrase suggestions 308 would be appended to the text at the position of the cursor.

Some users may ignore the suggestion where it could be otherwise helpful. For example, if a user initiates using phrase checking functions only after the user finishes writing a message, it may be too late to take advantage of the output phrase suggestions 308. In an embodiment, suggested phrases can be shown in-line with the source text, as in FIG. 6B. For example, in response to input at the second computer entering the source text unit 304, and in response to detecting that a particular sentence 601 matches a particular category of intent, a text processing extension 110A, 110B is programmed to instantiate and cause displaying a sub-window 604 in a position directly below the particular sentence. Or, the sub-window 604 could be generated and displayed in a position to the right side of and directly after the last word of the particular sentence, for example, after "help!" in the example of FIG. 6B. The position of the sub-window 604, as in-line in relation to the source text, can vary in different language systems; for example, when sub-window 302 receives text in a natural language that is composed from left to right and top to bottom, then the position shown in FIG. 6B and described above is appropriate. For other languages in which text is written from right to left, the position of sub-window 604 could be to the left, above, or below the text.

The sub-window 604 comprises a header bar 606 and a plurality of output phrase suggestions 608. Furthermore, an addition cursor 602 is displayed at a point in the source text unit 304 at which additional text will be inserted if the user accepts one of the output phrase suggestions 608. The format of FIG. 6B may make sentence suggestions immediately discoverable in a more efficient manner, increasing the acceptance rate.

3. IMPLEMENTATION EXAMPLE—HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field-programmable gate array (FPGA) that is persistently programmed to perform the techniques, or may include at least one general-purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
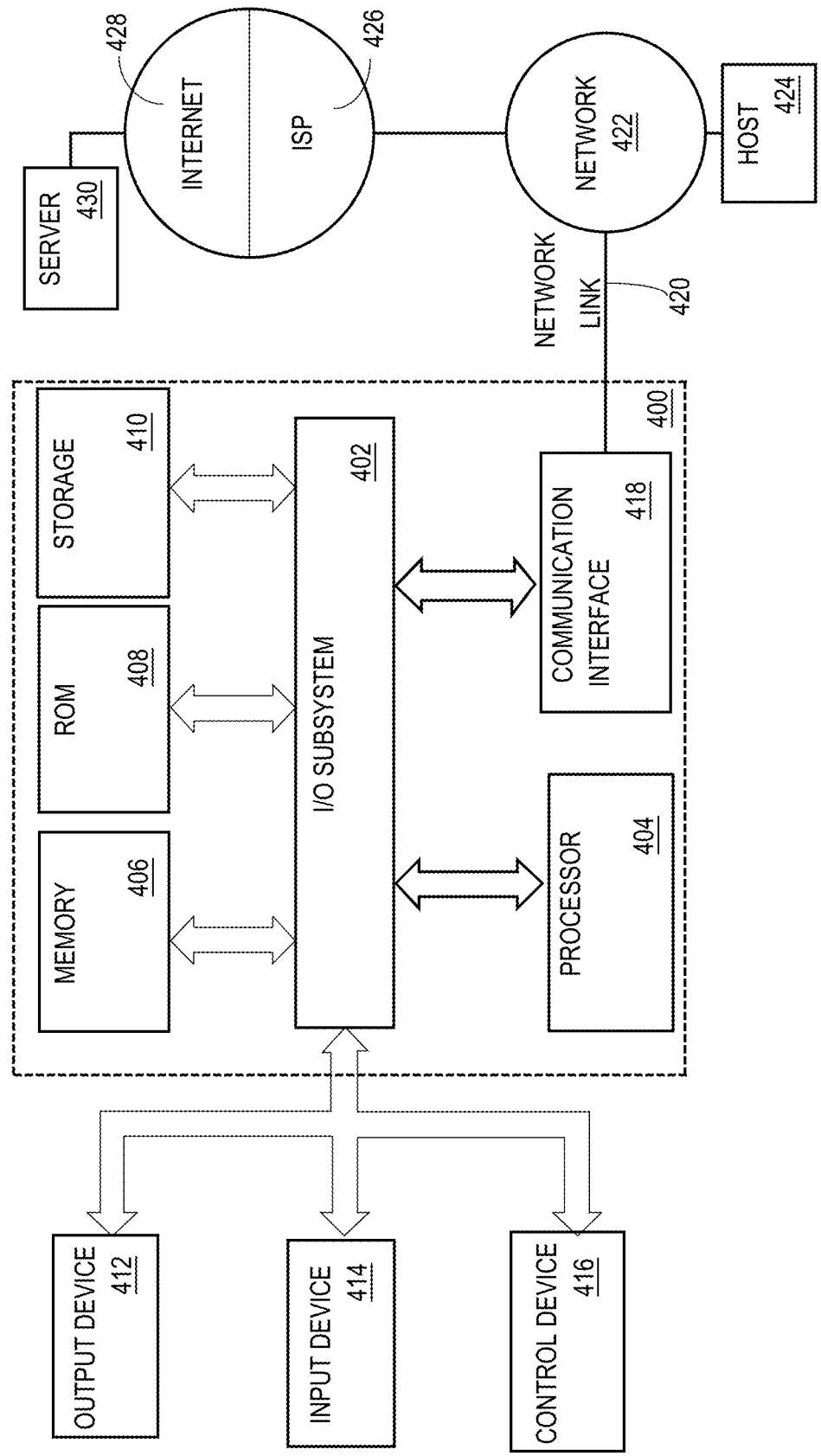
FIG. 4 illustrates a computer system with which one embodiment could be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanisms for communicating information and/or instructions between the components of the computer system 400 over electronic signal paths. The I/O subsystem 402 may include an I/O controller, a memory controller, and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or another dynamic storage device. Memory 406 also may be used for storing temporary variables or other intermediate information during the execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read-only memory (ROM) 408 or other static storage devices coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disks such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat-file system, or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include another type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators, or servos.

At least one input device 414 is coupled to I/O subsystem 402 for communicating signals, data, command selections, or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or another type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware, and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406.

Common forms of storage media include, for example, a hard disk, solid-state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 and place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to a network link(s) 420 that are directly or indirectly connected to at least one communication network, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 422 broadly represents a local area network (LAN), wide-area network (WAN), campus network, internetwork, or any combination thereof. Communication interface 418 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic, or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a worldwide packet data communication network represented as internet 428. A server computer 430 may be coupled to internet 428. Server 430 broadly represents any computer, data center, virtual machine, or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm, or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer, and data storage layer such as a relational database system using a structured query language (SQL) or no SQL, an object store, a graph database, a flat-file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed at a first computer and comprising:
    creating and digitally storing a phrase store of a plurality of phrase suggestions, wherein two or more phrase suggestions from among the plurality of phrase suggestions correspond to a particular category among two or more categories, each category of the two or more categories corresponding to a different intent from among a plurality of different intents;
    programmatically receiving a digital electronic object comprising a source text;
    dividing the source text into a plurality of source text units;
    evaluating each particular source text unit among the plurality of source text units using a machine learning model, wherein the machine learning model is trained using a training dataset that has been generated by applying an unsupervised machine learning model to build a dataset of sentences that represent a particular intent and annotating the dataset;
    receiving a classification output from the machine learning model that classifies each particular source text unit as a particular category among a plurality of possible categories, the classification output specifying that at least one particular source text unit matches one particular category selected from among the two or more categories;
    selecting, based on the classification output, one or more output phrase suggestions from the phrase store;
    transmitting, to a second computer, presentation instructions which when rendered using the second computer cause displaying the one or more output phrase suggestions and a position associated with the source text at which one of the one more output phrase suggestions can be inserted as additional text that follows the at least one particular source text unit;
    receiving from the second computer a selected phrase suggestion selected from the one or more output phrase suggestions; and
    updating the training dataset with the selected phrase suggestion after the receiving.

2. The computer-implemented method of claim 1, the selecting comprising any one of:
    mapping the classification output to a plurality of candidate phrase suggestions in a digital database, to yield an initial set of matching phrase suggestions, and filtering the initial set of matching phrase suggestions to yield the output phrase suggestions that are fewer in number than the initial set; and
    mapping the classification output to the plurality of candidate phrase suggestions in the digital database, to yield the initial set of matching phrase suggestions, scoring the candidate phrase suggestions, and selecting top N candidate phrase suggestions to yield the output phrase suggestions.

3. The computer-implemented method of claim 2, further comprising, before the filtering, ranking the initial set of matching phrase suggestions based on a ranking criterion.

4. The computer-implemented method of claim 2, further comprising, before the filtering, ranking the initial set of matching phrase suggestions in order of least similarity to the at least one particular source text unit.

5. The computer-implemented method of claim 1, the plurality of source text units comprising a plurality of sentences of the source text.

6. The computer-implemented method of claim 1, the plurality of source text units comprising a plurality of sentences of the source text, the method further comprising executing the dividing using a computer-implemented parser.

7. The computer-implemented method of claim 1, wherein the machine learning model comprises a trained multi-class text classifier comprising a FASTTEXT classifier.

8. The computer-implemented method of claim 1, the machine learning model comprising any of:
    a plurality of text classifiers coupled as an ensemble; or
    a plurality of targeted rules that are programmed to find relevant words and coupled to a classifier to approve or reject whether an instance of a word is correct.

9. The computer-implemented method of claim 1, further comprising:
    the first computer executing a text processor that is communicatively coupled to a text processing extension that is executed at the second computer;
    programmatically receiving the digital electronic object comprising the source text via a message initiated at the text processing extension and transmitted to the text processor; and
    the text processing extension executing in association with an application program that is executing at the second computer, the text processing extension being programmed to automatically detect a change in a text entry window of the application program and, in response, to initiate the message.

10. The computer-implemented method of claim 1, further comprising:
    the first computer executing a text processor that is communicatively coupled to a text processing extension that is executed at the second computer;
    programmatically receiving the digital electronic object comprising the source text via a message initiated at the text processing extension and transmitted to the text processor; and
    the text processor executing in association with a browser that is executing at the second computer, the text processing extension being programmed to automatically detect a change in a text entry widget of the browser and, in response, to initiate the message.

11. The computer-implemented method of claim 1, the machine learning model being trained to classify each particular source text unit as one of the particular categories selected from among: thank, happy birthday, ask for help, decline invitation, follow up, congratulate, introduce, apology, announcement, setting up a meeting.

12. The computer-implemented method of claim 1, wherein one or more of the categories further comprises one or more sub-categories, the method further comprising:
based on the particular category of the classification output, evaluating a plurality of programmed rules to determine that the at least one particular source text unit matches one particular subcategory from among the one or more sub-categories; and
based on the plurality of programmed rules, modifying the one or more output phrase suggestions.

13. The computer-implemented method of claim 1, further comprising transmitting, to the second computer, the presentation instructions which when rendered using the second computer cause displaying the one or more output phrase suggestions and an additional cursor in a position near the at least one particular source text unit at which one of the one or more output phrase suggestions can be inserted as additional text that follows the at least one particular source text unit.

14. The computer-implemented method of claim 1, further comprising:
transmitting, to the second computer, first presentation instructions which when rendered using the second computer cause displaying a GUI window that is visually separate from a sub-window that contains or displays the source text; and
transmitting, to the second computer, second presentation instructions which when rendered using the second computer cause displaying the one or more output phrase suggestions in the GUI window, and an additional cursor in a position near the at least one particular source text unit at which one of the one or more output phrase suggestions can be inserted as additional text that follows the at least one particular source text unit.

15. The computer-implemented method of claim 1, further comprising:
transmitting, to the second computer, first presentation instructions which when rendered using the second computer cause displaying a GUI window that is visually in-line with a sub-window that contains or displays the source text; and
transmitting, to the second computer, second presentation instructions which when rendered using the second computer cause displaying the one or more output phrase suggestions in the GUI window, and an additional cursor in a position near the at least one particular source text unit at which one of the one or more output phrase suggestions can be inserted as additional text that follows the at least one particular source text unit.

16. One or more non-transitory computer-readable media storing one or more sequences of instructions which, when executed using a first computer, cause the first computer to execute:
creating and digitally storing a phrase store of a plurality of phrase suggestions, wherein two or more phrase suggestions from among the plurality of phrase suggestions correspond to a particular category among two or more categories, each category of the two or more categories corresponding to a different intent from among a plurality of different intents;
programmatically receiving a digital electronic object comprising a source text;
dividing the source text into a plurality of source text units;
evaluating each particular source text unit among the plurality of source text units using a machine learning model, wherein the machine learning model is trained using a training dataset that has been generated by applying an unsupervised machine learning model to build a dataset of sentences that represent a particular intent and annotating the dataset;
receiving a classification output from the machine learning model that classifies each particular source text unit as a particular category among a plurality of possible categories, the classification output specifying that at least one particular source text unit matches one particular category selected from among the two or more categories;
selecting, based on the classification output, one or more output phrase suggestions from the phrase store;
transmitting, to a second computer, presentation instructions which when rendered using the second computer cause displaying the one or more output phrase suggestions and a position associated with the source text at which one of the one more output phrase suggestions can be inserted as additional text that follows the at least one particular source text unit;
receiving from the second computer a selected phrase suggestion selected from the one or more output phrase suggestions; and
updating the training dataset with the selected phrase suggestion after the receiving.

17. The one or more non-transitory computer-readable media of claim 16, the plurality of source text units comprising a plurality of sentences of the source text.

18. The one or more non-transitory computer-readable media of claim 16, the plurality of source text units comprising a plurality of sentences of the source text, the one or more non-transitory computer-readable media further comprising sequences of instructions which when executed by the first computer cause executing the dividing using a computer-implemented parser.

19. The one or more non-transitory computer-readable media of claim 16, the machine learning model comprising a trained multi-class text classifier comprising a FASTTEXT classifier.

20. The one or more non-transitory computer-readable media of claim 16, the selecting comprising any one of:
mapping the classification output to a plurality of candidate phrase suggestions in a digital database, to yield an initial set of matching phrase suggestions, and filtering the initial set of matching phrase suggestions to yield the output set of phrase suggestions that are fewer in number than the initial set; and
mapping the classification output to the plurality of candidate phrase suggestions in the digital database, to yield the initial set of matching phrase suggestions, scoring the candidate phrase suggestions, and selecting top N candidate phrase suggestions to yield the output phrase suggestions.

21. The one or more non-transitory computer-readable media of claim 20, further comprising sequences of instructions which when executed by the first computer cause, before the filtering, ranking the initial set of matching phrase suggestions based on a ranking criterion.

22. The one or more non-transitory computer-readable media of claim 20, further comprising sequences of instructions which when executed by the first computer cause, before the filtering, ranking the initial set of matching phrase suggestions in order of least similarity to the at least one particular source text unit.

23. The one or more non-transitory computer-readable media of claim 16, further comprising sequences of instructions which when executed by the first computer cause:
   executing a text processor that is communicatively coupled to a text processing extension that is executed at the second computer; and
   programmatically receiving the digital electronic object comprising the source text via a message initiated at the text processing extension and transmitted to the text processor.

24. The one or more non-transitory computer-readable media of claim 23, the text processing extension executing in association with an application program that is executing at the second computer, the text processing extension being programmed to automatically detect a change in a text entry window of the application program and, in response, to initiate the message.

25. The one or more non-transitory computer-readable media of claim 23, the text processor executing in association with a browser that is executing at the second computer, the text processing extension being programmed to automatically detect a change in a text entry widget of the browser and, in response, to initiate the message.

26. The one or more non-transitory computer-readable media of claim 16, the machine learning model being trained to classify each particular source text unit as the particular category from among: thank, happy birthday, ask for help, decline invitation, follow up, congratulate, introduce, apology, announcement, setting up a meeting.

27. The one or more non-transitory computer-readable media of claim 16, wherein one or more of the categories further comprises one or more sub-categories, further comprising sequences of instructions which when executed by the first computer cause:
   based on the particular category of the classification output, evaluating a plurality of programmed rules to determine that the at least one particular source text unit matches one particular subcategory from among the one or more sub-categories; and
   based on the plurality of programmed rules, modifying the one or more output phrase suggestions.

28. The one or more non-transitory computer-readable media of claim 16, further comprising sequences of instructions which when executed by the first computer cause transmitting, to the second computer, the presentation instructions which when rendered using the second computer cause displaying the one or more output phrase suggestions and an addition cursor in a position near the at least one particular source text unit at which one of the one or more output phrase suggestions can be inserted as additional text that follows the at least one particular source text unit.

29. The one or more non-transitory computer-readable media of claim 16, further comprising sequences of instructions which when executed by the first computer cause:
   transmitting, to the second computer, first presentation instructions which when rendered using the second computer cause displaying a GUI window that is visually separate from a sub-window that contains or displays the source text; and
   transmitting, to the second computer, second presentation instructions which when rendered using the second computer cause displaying the one or more output phrase suggestions in the GUI window, and an addition cursor in a position near the at least one particular source text unit at which one of the one or more output phrase suggestions can be inserted as additional text that follows the at least one particular source text unit.

30. The one or more non-transitory computer-readable media of claim 16, further comprising
   sequences of instructions which when executed by the first computer cause:
   transmitting, to the second computer, first presentation instructions which when rendered using the second computer cause displaying a GUI window that is visually in-line with a sub-window that contains or displays the source text; and
   transmitting, to the second computer, second presentation instructions which when rendered using the second computer cause displaying the one or more output phrase suggestions in the GUI window, and an addition cursor in a position near the at least one particular source text unit at which one of the one or more output phrase suggestions can be inserted as additional text that follows the at least one particular source text unit.

\* \* \* \* \*